Oct. 26, 1965  L. SEYDELMANN  3,213,911
MEAT GRINDER WITH PREBREAKING MEANS
Filed July 31, 1963  2 Sheets-Sheet 1

INVENTOR
Ludwig Seydelmann

BY  Mestern, Ross & Mestern

3,213,911
MEAT GRINDER WITH PREBREAKING MEANS
Ludwig Seydelmann, Holderlinstrasse 9,
Stuttgart, Germany
Filed July 31, 1963, Ser. No. 298,871
Claims priority, application Germany, Apr. 1, 1963,
S 84,494
10 Claims. (Cl. 146—181)

The present invention relates to a meat grinder of the type which is provided with at least one conveyer screw between a feed hopper and an apertured disk which is operatively associated with a cutting blade.

Meat grinders of this type are often designed for the purpose of cutting up larger pieces of meat. If, however, such pieces are frozen together into hard and rigid blocks, the difficulty frequently occurs that several meat pieces which are passed together or successively into the hopper combine into a bridge which prevents these as well as the following pieces from passing to the conveyer screw. Furthermore, due to their rigidity, it is common that the frozen meat pieces cannot enter between the turns of the conveyer screw or that if they do enter that they are again pushed out of the screw turns instead of being conveyed toward the cutter. For this reason it has previously been necessary first to thaw out such blocks of frozen meat or to cut them up by hand or by means of special machines, all of which involved a considerable waste of time and energy.

It is an object of the present invention to provide a meat grinder of the type as described above which is designed to overcome the above-mentioned disadvantages so that there will be no longer any difficulties in feeding and grinding rigidly frozen meat pieces.

In accordance with the present invention this object is attained by providing the meat grinder with a preliminary comminuter which is preferably installed between the feed hopper and the subsequent conveyer screw of the meat grinder.

According to a preferred embodiment of the invention, the preliminary meat comminuter or breaker consists of a rotatable shaft which is provided with several sharp-edged comminuting blades which project substantially radially from this shaft toward a wall which serves as a chopping block. During the rotation of the shaft in the direction toward the conveyer screw, these blades press the frozen meat which is fed into the hopper, for example, in the form of blocks, against this wall then break up, crush or otherwise comminute the meat blocks into smaller pieces, which although still frozen, can then pass easily between the turns of the conveyer screw.

Another feature of the invention resides in also employing the blades as means for positively feeding the comminuted-meat pieces between the rotating conveyer screw. For attaining this object, the invention further provides that the shaft is mounted substantially parallel to the axis of rotation of the conveyer screw and at such a distance therefrom that, during their rotation in a direction substantially transverse to the axis of the conveyer screw, the blades will enter and pass periodically between the turns of the conveyer screw. For this purpose and also for attaining a greater conveying rate, it is advisable to employ a coreless conveying screw, that is, one without a central shaft. Of course, the operation of the blades in passing periodically between the turns of the conveyer screw requires the crusher shaft to be driven at a certain speed ratio relative to the conveyer screw so that the blades will not hit against the screw turns. The mentioned arrangement of the crusher shaft at such a small distance from the axis of the conveyer screw that the blades will pass between the screw turns also has the advantage that it permits the machine to be constructed very compactly and of relatively small dimensions.

Since the blades can exert their comminuting or cutting action only in the direction of their rotation toward the conveyer screw, it is further advisable, especially if the blades extend from their shaft in only one radial direction, and not also in the opposite direction, to provide suitable means for guiding the frozen meat blocks to be crushed toward the wall in front of the shaft which serves as a chopping block and for preventing them from passing from the hopper through the area behind the shaft to the conveyer screw during the period in the rotation of the blades in which they are located outside of this area and do not block the passage of the meat blocks therethrough. These guiding means consist according to the invention in extending the rear wall of the hopper substantially toward the axis of the comminuter shaft, in mounting the shaft so as to be rotatable within a trough-shaped recess or groove in this wall, and in providing channellike recesses in this rear wall which are enclosed by lateral and rear wall portions and have their openings toward the shaft to permit the crusher blades to pass therethrough.

The various features and advantages of the present invention will become more clearly apparent from the following detailed description of a preferred embodiment thereof which is illustrated in the accompanying drawings, in which:

FIGURE 2 shows, also partly in section, a top view of the meat grinder; while

Figure 1:
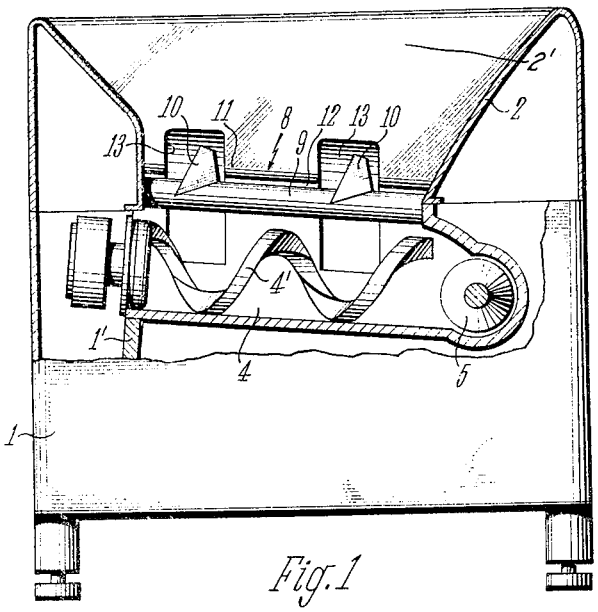
FIGURE 1 shows, partly in section, a side view of the meat grinder according to the invention.
Figure 2:
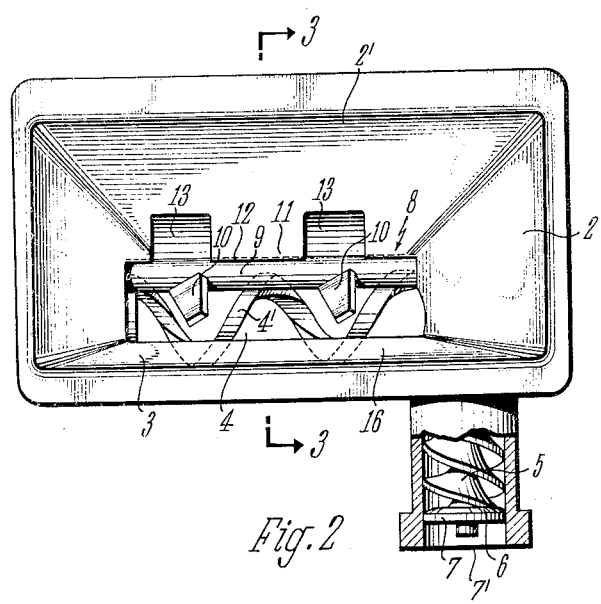

As illustrated in the drawings, the meat grinder according to the invention comprises a housing which consists primarily of a lower part 1 with an elongated conveying channel 4 therein, and an upper part which is secured to this lower part and designed at the inside to form an elongated feed hopper 2 the constricted lower end 3 of which fits upon and is flush with the upper end of the conveying channel 4. This conveying channel 4 contains a coreless conveyer screw or helix 4' which is rotatably mounted on an inner side wall 1' of the lower housing part 1. The conveying channel 4 as well as the conveyer screw 4' therein are inclined at a slight angle downwardly toward a second rotatable conveyer screw 5 which extends at a substantially right angle to screw 4'. After receiving the meat to be ground from the first conveyer screw 4', the second conveyer screw 5 is adapted to feed the meat to a cutter 6 which cooperates in a conventional manner with an apertured disk 7 to grind or mince the meat and then to discharge the ground meat through the apertures in disk 7 and from the outlet 7' of the machine.

The principal feature of the invention resides in the provision of a precrushing or comminuting mechanism 8 which consists of a shaft 9 which extends substantially parallel to the axis of rotation of the conveyor screw 4' and is adapted by suitable means, not shown, to be driven in the same direction as the conveyer screw 4' and at a speed in a fixed ratio to the speed of screw 4'. This shaft 9 carries two radially projecting blades or arms 10 with sharp cutting edges thereon and it is mounted at such a distance from the axis of the conveyer screw 4' that during the rotation of shaft 9 and the blades 10 thereon, the latter will pass transversely between the turns of the conveyer screw. Since the blades can exert their crushing or cutting action upon the frozen meat to be ground only in their direction of rotation toward the conveyer screw 4', the rear wall 2' of the hopper 2 is made of a special design so as to serve as a guide surface to lead the meat to be comminuted toward the front side of shaft 9. The lower part 11 of the rear wall 2' of the hopper is for this purpose extended as far as possible toward the shaft 9 and moreover it is provided with a groove 12 so as partly to encompass the shaft without engaging therewith. In order to permit the blades 10 to revolve freely about the axis of shaft 9, a pair of channels 13 are provided in this wall portion 11. By designing the lower part 11 of the rear wall 2' of the hopper so as to envelop the rear side of shaft 9 except the parts thereof carrying the blades 10, and by even enclosing these blades 10 within the channels 13, the advantage is attained that, during the period of the continuous rotation of shaft 9 in which the blades 10 are turned away from the lower part of the rear wall 2' and carry out their forward and downward stroke, the frozen meat pieces which are fed into the hopper will be guided toward the front side of the comminuter 8 and cannot slide in the uncomminuted condition behind the shaft 9 toward the conveyer screw 4'.

Figure 3:
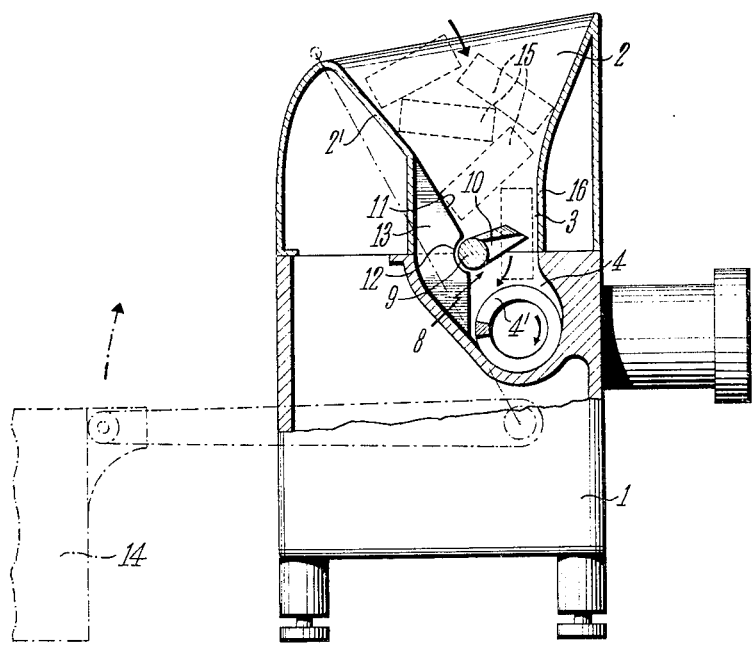
FIGURE 3 shows a cross-section which is taken along the line III—III of FIGURE 2.

In the operation of the meat grinder according to the invention, the frozen pieces of meat which are preferably supplied in the form of meat blocks 15 as indicated in dotted lines in FIGURE 3, are fed into the hopper 2 preferably by means of a pivotable loading device 14, as indicated in dot-and-dash lines in FIGURE 3 and then slide along the walls of the latter downwardly toward the front side of the comminuter 8 where they are drawn by the crusher blades 10 in the direction toward the conveyer screw 4'. During this movement the frozen meat blocks 15 are first passed along the lower part 16 of the front wall of the hopper serves as a chopping block and the crusher blades 10 then cut into and break apart the meat blocks 15. The broken pieces of frozen meat then fall into the coreless conveyer screw 4' which feeds them in the conventional manner to the subsequent conveyer screw 5 which, in turn, feeds them to the cutter 6 and the associated apertured disk 7 from which the ground meat is finally discharged through the outlet 7' of the machine.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A meat grinder comprising a housing; a feed hopper on said housing; conveying-channel means formed in said housing, at least one continuous, generally helical conveyer screw rotatably mounted in said housing within said channel means; comminuting means including a shaft rotatably mounted in said housing intermediate said feed hopper and said conveyer screw and extending generally parallel thereto, and at least one arm secured to and projecting substantially radially from said shaft toward said screw, said housing having an inner wall portion co-operating with said arm upon rotation of said shaft to comminute the meat fed into said hopper on said wall portion to a size sufficiently small to permit it to enter between the turns of said conveying screw, said screw having a radius greater than the difference between the interaxial spacing of said screw and said shaft less the radial length of said arm from the axis of said shaft and a pitch sufficient to clear said arm whereby said arm extends between the turns of said screw upon synchronous rotation of said shaft therewith; and means for mincing the comminuted meat displaced by said conveyer screw and for discharging it from the housing.

2. A meat grinder as defined in claim 1, in which said arm is provided with sharp cutting edges.

3. A meat grinder comprising a housing, a feed hopper on said housing; conveying-channel means formed in said housing; at least one conveyer screw rotatably mounted in said housing within said channel means; comminuting means comprising a shaft rotatably mounted in said housing above said conveying screw, and comminuting blades secured to and projecting substantially radially from said shaft, said housing having an inner wall portion above said conveying screw and in front of said shaft, said blades being adapted when said shaft rotates to comminute the meat fed into said hopper on said wall portion to a size sufficiently small to permit it to enter between the turns of said conveying screw, said feed hopper having a rear wall with wall portions behind said shaft projecting downwardly and forwardly toward said shaft at both sides of the areas traversed by said blades and to a line substantially parallel to and at a small distance from said shaft for guiding the meat to be comminuted toward the area forwardly of said shaft, and channel portions at said areas in said rear wall and open toward said shaft for permitting the passage of said blades during the rotation of said shaft; and means for mincing the comminuted meat delivered by said conveyer screw and for then discharging it from the machine.

4. A meat grinder as defined in claim 3 wherein said shaft and said conveyer screw are mounted so that their axes extend substantially parallel to each other and at such a small distance from each other that said blades feed the comminuted meat between the turns of said conveyer screw.

5. A meat grinder as defined in claim 3 wherein said shaft and said conveyer screw are mounted so that their axes extend substantially parallel to each other and at such a small distance from each other that said blades pass between the turns of said conveyer screw and feed the comminuted meat positively between said turns.

6. A meat grinder as defined in claim 3 wherein said conveying screw is coreless, said shaft and said conveyer screw being mounted so that their axes extend substantially parallel to each other and at such a small distance from each other that said blades pass between the turns of said conveyer screw beyond the axis of said screw to feed the comminuted meat positively between said turns.

7. A meat grinder as defined in claim 3, in which said guiding wall portions have a groove therein extending parallel to said shaft, the parts of said shaft at both sides of said channels being received in said groove so as to be partly enclosed therein.

8. A meat grinder as defined in claim 3, in which said guiding portions and channels extend downwardly beyond said shaft into said channel means to an area closely adjacent to and behind said conveyer screw for preventing the comminuted meat fed by said blades between said turns of said conveyer screw from leaving said turns.

9. A meat grinder comprising a housing; meat-grinding means in said housing and including a first conveyer screw rotatably mounted in said housing, cutter means coupled with said screw and disposed at one axial extremity thereof for mincing meat advanced by said screw toward said extremity, and an apertured disk co-operating with said cutter means for extruding ground meat from said housing; a feed hopper on said housing disposed above said meat-grinding means and having a channel communicating therewith for supplying meat to said first screw; and prebreaking means in said channel for comminuting large bodies of meat placed in said hopper into smaller pieces to be supplied to said first screw, said prebreaking means including a second conveyer screw having an axis generally transverse to that of said first screw for supplying precomminuted meat thereto at a location rearwardly of said cutter means in the direction of advance of said meat along said first screw, a comminuter shaft journaled in said housing for rotation about an axis substantially parallel to that of said second screw and disposed above the axis thereof, at least one generally radially extending comminuting arm carried by said shaft and engageable with meat fed into said hopper for breaking it up and feeding the pieces of precomminuted meat to said second screw, 10. A meat grinder as defined in claim 9 wherein a plurality of axially spaced comminuting blades extend radially from said shaft and said second screw has a radius greater than the difference between the interaxial spacing of said second screw and said shaft less the radial length of the arms from the axis of said shaft, said second screw further having a pitch sufficient to clear said arms whereby said arms extend between and are interleaved with the turns of said second screw and said shaft, said second screw being of the coreless type, said housing being formed with wall portions having passages through which said arms swing upon rotation of said shaft for severing the meat introduced into said hopper between said arms and said wall portions.

References Cited by the Examiner

UNITED STATES PATENTS

| | | | |
|---|---|---|---|
| 679,884 | 8/01 | Burton | 146—181 |
| 855,379 | 5/07 | Bangs. | |
| 1,459,713 | 6/23 | Beggs | 146—182 X |
| 2,200,061 | 5/40 | Green | 146—181 |
| 2,971,551 | 2/61 | Rietz | 146—182 |

FOREIGN PATENTS 579,527  6/33  Germany.

ROBERT C. RIORDON, *Primary Examiner.*

J. SPENCER OVERHOLSER, *Examiner.*